UNITED STATES PATENT OFFICE.

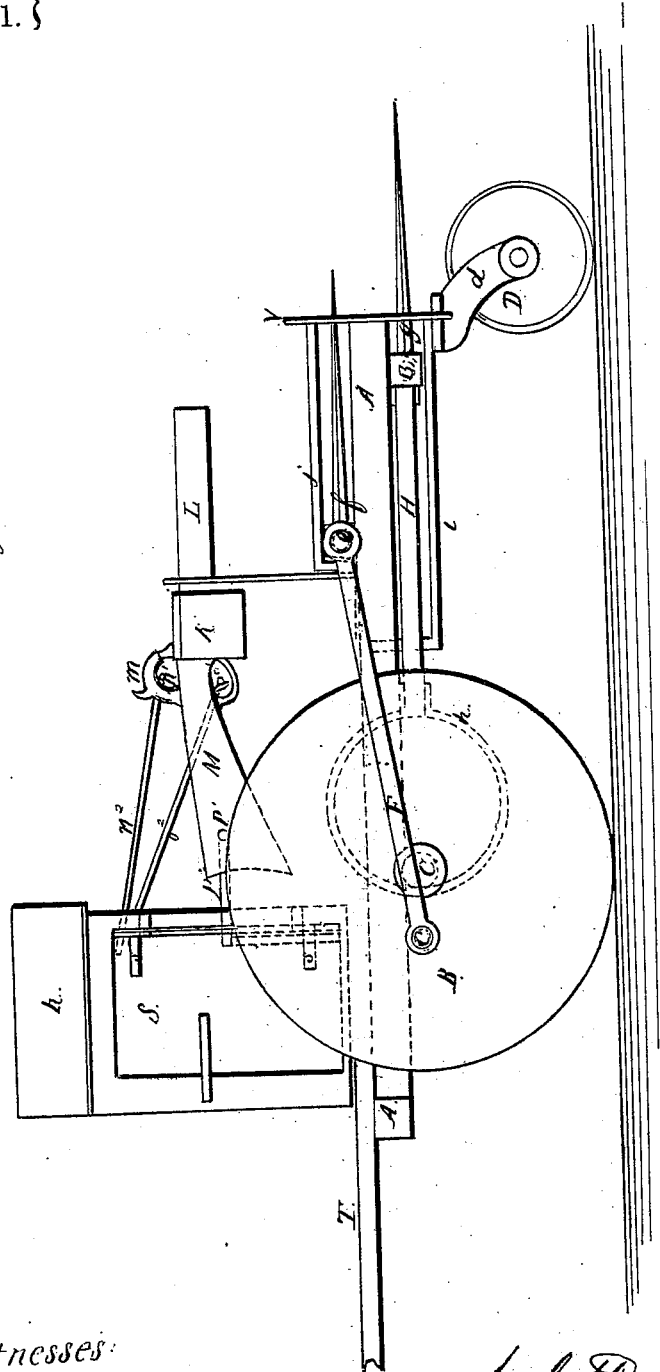

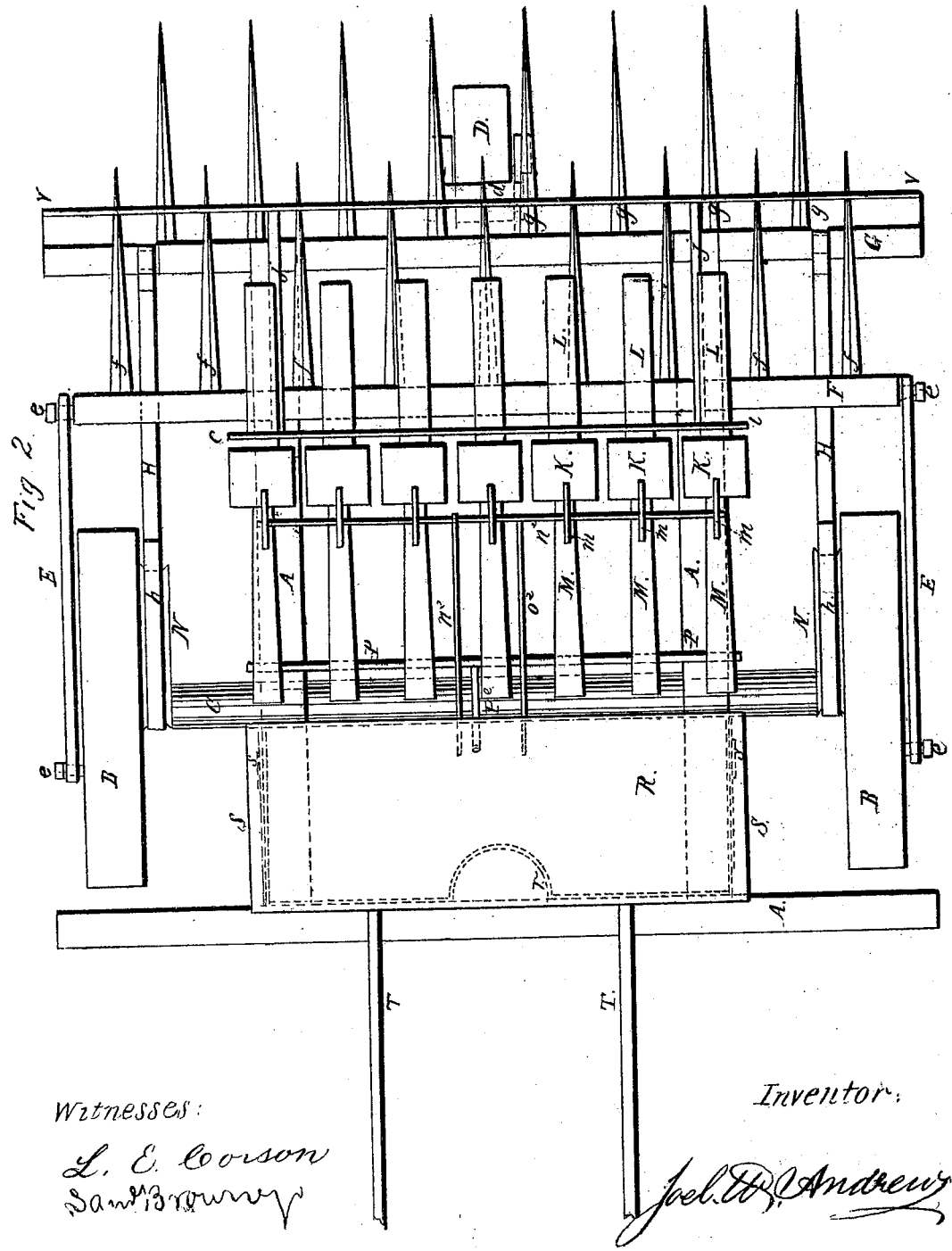

JOEL W. ANDREWS, OF NORRISTOWN, PENNSYLVANIA.

IMPROVEMENT IN GUN AND BAYONET BATTERIES.

Specification forming part of Letters Patent No. 33,731, dated November 19, 1861.

*To all whom it may concern:*

Be it known that I, JOEL W. ANDREWS, of Norristown, in the county of Montgomery and State of Pennsylvania, have invented a new and useful Flying Gun and Bayonet Battery for War Purposes; and I do hereby declare that the following is a full, clear, and exact description of the construction and operation of the same, reference being had to the annexed drawings, making a part of this specification, in which—

Figure 1 is a side view, and Fig. 2 a top view.

A A, &c., show the framing, and B B, &c., the wheels of the carriage upon which it is borne; C, the shaft on which the wheels are permanently fixed, working in bearings or boxes under the framing A A; D, the front wheel, furnished with a fork and bearings, $d$, and center pivot or pin secured to the frame A A, in the center thereof, to support the front of the carriage; G, a sliding bar, in which are fastened and arranged a number of bayonets, $g\ g$, &c., and which is connected by two rods, H H, to two eccentrics, N N, which are fastened to shaft C; $i$, a rod to support and guide the bar G; F, a sliding bar, in which are fastened a number of bayonets, $f\ f$, &c., similar to $g\ g$ in G. The bar F is connected with the crank-pins $e\ e$ by rods E E, and hinge on the pins $e\ e$ on ends of bar F. During the revolutions of the wheels the crank-pins $e\ e$ and eccentrics N N impart a reciprocating motion to the bayonet-bars F and G. The crank-pins are diametrically opposite the eccentrics, and therefore impart an advancing motion to one bar while the other is retreating. $j$ is a guide-rod over sliding bar F, to keep it in place; V, a perforated iron fender to guide the bayonets and give them support while working; M M, the butts of the guns; K K, the revolving chambers or breeches; L L, the barrels of the guns; $l$, an iron fender and support for the guns, through which the barrels project. $m\ m$, &c., show the cocks of of the guns; $n'$, a rod connected with all the cocks, and for the purpose of cocking the guns a rod, $n^2$, connected with it passes into the operator's box; $o'$, a rod connected with all the triggers. The rod $o^2$, connected with it, passes into the operator's box. $p'$ is a rod binding all the butts of the guns rigidly together. A rod, $p^2$, connected with it, passes into the operator's box, and is adjusted vertically on an upright rod with a screw and nut, for the purpose of varying the range of the guns. These rods $n^2$, $o^2$, and $p^2$ terminate in convenient positions for the operator within the house or box R, and enable him to raise and depress the elevation of the guns, and "cock" and "fire" them at pleasure. The operator's box R is strongly made of iron to shield and protect him, and the horse from the fire of the enemy; $s\ s$, two doors for the ingress and egress of the operator. T T are shafts for attaching the horse. His head is toward the machine in the semicircle $r$ when in pursuit or in action, but in retreating or going to the field of action the horse is reversed. The whole forms one complete machine, in which the combined strength and speed of a horse with the power and skill of one man can direct, operate, and manage a number of guns and bayonets so as to be as effective upon a field of battle as twenty-five or thirty men equipped as infantry.

This machine would be very effective against infantry or cavalry, and would completely protect a body of infantry against a large number of cavalry. The operator, being protected in his box, can shoot any approaching enemy, with small-arms, through apertures made in his box for that purpose. These apertures also serve as look-out holes to see the course to direct the machine.

Any kind of light guns can be used upon this machine.

What I claim, and desire to secure by Letters Patent, is—

1. The bars F and G, into which are secured a number of bayonets $g\ g$, &c., and $j\ j$, &c., arranged, constructed, and operated in connection with a carriage, substantially as and for the purpose herein described.

2. The combination of a number of guns and bayonets, fixed, arranged, and operated on a carriage, substantially in the manner set forth, and for the purpose described.

JOEL W. ANDREWS.

Witnesses:
L. E. CORSON,
SAML. BROWN, Jr.